(12) United States Patent
Higuchi et al.

(10) Patent No.: US 6,746,345 B2
(45) Date of Patent: *Jun. 8, 2004

(54) MULTI-PIECE SOLID GOLF BALL

(75) Inventors: Hiroshi Higuchi, Chichibu (JP); Hirotaka Shimosaka, Chichibu (JP); Yasushi Ichikawa, Chichibu (JP); Rinya Takesue, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 7 days.

This patent is subject to a terminal disclaimer.

(21) Appl. No.: 09/906,844

(22) Filed: Jul. 18, 2001

(65) Prior Publication Data

US 2002/0055400 A1 May 9, 2002

Related U.S. Application Data (60) Provisional application No. 60/237,727, filed on Oct. 5, 2000.

(30) Foreign Application Priority Data

Sep. 11, 2000 (JP) ........................................ 2000-274807

(51) Int. Cl.⁷ ........................... A63B 37/04; A63B 37/06
(52) U.S. Cl. ........................ 473/371; 473/373; 473/374; 473/377; 473/378
(58) Field of Search ........................ 473/351, 354–365, 473/367–368, 370–378; 524/394, 397, 436, 322

(56) References Cited

U.S. PATENT DOCUMENTS

| | | |
|---|---|---|
| 3,404,134 A | 10/1968 | Rees |
| 3,959,539 A | 5/1976 | Waggoner |
| 4,526,375 A | 7/1985 | Nakade |
| 4,984,804 A | 1/1991 | Yamada et al. |

(List continued on next page.)

FOREIGN PATENT DOCUMENTS

| | | |
|---|---|---|
| GB | 1113409 | 5/1968 |
| GB | 2 278 609 | 12/1994 |

(List continued on next page.)

Primary Examiner—Derris H. Banks
Assistant Examiner—Dmitry Suhol
(74) Attorney, Agent, or Firm—Sughrue Mion, PLLC (57) ABSTRACT

In a multi-piece solid golf ball comprising a solid core and a cover of two inner and outer layers enclosing the solid core, the solid core has a deflection of at least 1.1 mm under an applied load of 294 N (30 kgf) and a surface and a center, the surface-center hardness difference given as a JIS-C hardness at the core surface minus a JIS-C hardness at the core center is greater than 15 units, the cover inner layer is formed of a resin composition comprising as essential components, (a) an olefin-unsaturated carboxylic acid random copolymer, an olefin-unsaturated carboxylic acid-unsaturated carboxylate random copolymer, a metal ion neutralized product of each copolymer, or a mixture of each copolymer and the neutralized product, (b) a fatty acid having a molecular weight of at least 280 or derivative thereof, and (c) a basic inorganic metal compound capable of neutralizing acid groups in components (a) and (b), the Shore D hardness of the cover inner layer, the Shore D hardness of the cover outer layer, and the hardness relationship between the cover inner layer and the cover outer layer are adjusted, and the sum of dimple trajectory volumes each obtained by multiplying the volume of a dimple by the square root of a dimple diameter is optimized.

12 Claims, 1 Drawing Sheet

U.S. PATENT DOCUMENTS

| | | | |
|---|---|---|---|
| 4,999,404 A | 3/1991 | Matsuki | |
| 5,019,320 A | 5/1991 | Hasegawa et al. | |
| 5,253,871 A | 10/1993 | Viollaz | |
| 5,306,760 A | 4/1994 | Sullivan | |
| 5,312,857 A | 5/1994 | Sullivan | |
| 5,314,187 A | 5/1994 | Proudfit | |
| 5,439,227 A | 8/1995 | Egashira et al. | |
| 5,490,674 A | 2/1996 | Hamada et al. | |
| 5,553,852 A | 9/1996 | Higuchi et al. | |
| 5,556,098 A | 9/1996 | Higuchi et al. | |
| 5,559,188 A | 9/1996 | Egashira et al. | |
| 5,586,950 A | 12/1996 | Endo | |
| 5,605,968 A | 2/1997 | Egashira et al. | |
| 5,704,854 A | 1/1998 | Higuchi et al. | |
| 5,730,663 A | 3/1998 | Tanaka et al. | |
| 5,779,561 A | 7/1998 | Sullivan et al. | |
| 5,779,563 A | 7/1998 | Yamagishi et al. | |
| 5,782,707 A | 7/1998 | Yamagishi et al. | |
| 5,803,831 A | 9/1998 | Sullivan et al. | |
| 5,824,740 A | 10/1998 | Yabuki et al. | |
| 5,899,822 A | 5/1999 | Yamagishi et al. | |
| 5,902,855 A | 5/1999 | Sullivan et al. | |
| 5,929,189 A | 7/1999 | Ichikawa et al. | |
| 5,948,859 A | 9/1999 | Sano et al. | |
| 5,952,415 A | 9/1999 | Hwang | |
| 5,976,443 A | 11/1999 | Nesbitt et al. | |
| 5,994,470 A | 11/1999 | Tanaka et al. | |
| 6,004,226 A | 12/1999 | Asakura | |
| 6,015,356 A | 1/2000 | Sullivan et al. | |
| 6,018,003 A | 1/2000 | Sullivan | |
| 6,034,182 A * | 3/2000 | Kashiwagi et al. | 473/351 |
| 6,100,321 A | 8/2000 | Chen | |
| 6,117,026 A * | 9/2000 | Hayashi et al. | 473/371 |
| 6,245,858 B1 | 6/2001 | Sullivan et al. | |
| 6,319,153 B1 | 11/2001 | Nesbitt et al. | |
| 6,325,731 B1 | 12/2001 | Kennedy, III et al. | |
| 6,329,458 B1 * | 12/2001 | Takesue et al. | 473/351 |
| 6,565,455 B2 * | 5/2003 | Hayashi et al. | 473/371 |
| 6,565,456 B2 * | 5/2003 | Hayashi et al. | 473/373 |
| 2002/0061793 A1 * | 5/2002 | Higuchi et al. | 473/371 |
| 2002/0099120 A1 * | 7/2002 | Takesue et al. | 524/394 |
| 2002/0111407 A1 * | 8/2002 | Takesue et al. | 524/322 |
| 2002/0119840 A1 * | 8/2002 | Higuchi et al. | 473/384 |

FOREIGN PATENT DOCUMENTS

| | | |
|---|---|---|
| JP | 4-244174 | 9/1992 |
| JP | 5-3931 | 1/1993 |
| JP | 6-142228 | 5/1994 |
| JP | 6-218078 | 8/1994 |
| JP | 6-343718 | 12/1994 |
| JP | 7-24084 | 1/1995 |
| JP | 7-24085 | 1/1995 |
| JP | 7-194735 | 8/1995 |
| JP | 7-194736 | 8/1995 |
| JP | 8-322962 | 12/1996 |
| JP | 9-10358 | 1/1997 |
| JP | 9-117532 | 5/1997 |
| JP | 9-215775 | 8/1997 |
| JP | 9-239068 | 9/1997 |
| JP | 9-313643 | 12/1997 |
| JP | 10-57523 | 3/1998 |
| JP | 10-151226 | 6/1998 |
| JP | 10-201880 | 8/1998 |
| JP | 10-216271 | 8/1998 |
| JP | WO98/46671 | 10/1998 |
| JP | 10-305114 | 11/1998 |
| JP | 11-57067 | 3/1999 |
| JP | 11-104271 | 4/1999 |
| JP | 11-104273 | 4/1999 |
| WO | WO 00/23519 A1 | 4/2000 |
| WO | WO 01/29129 A1 | 4/2001 |

* cited by examiner

FIG.1

MULTI-PIECE SOLID GOLF BALL

CROSS REFERENCE TO RELATED APPLICATION

This application is an application filed under 35 U.S.C. §111(a) claiming benefit pursuant to 35 U.S.C §119(e)(i) of the filing date of the Provisional Application No. 60/237,727 filed on Oct. 5, 2000 pursuant to 35 U.S.C. §111(b).

BACKGROUND OF THE INVENTION

1. Field of the Invention

This invention relates to a multi-piece solid golf ball comprising a solid core and a cover of two inner and outer layers enclosing the solid core and more particularly, to a multi-piece solid golf ball best suited for those players with a head speed of about 50 m/s.

2. Prior Art

At present, golf balls of various structures have been proposed. A greater number of proposals are made on solid golf balls, especially multi-piece solid golf balls having a solid core enclosed with a cover of plural layers, so as to improve their travel distance, controllability or spin rate and feel when hit. See JP-A 4-244174, JP-A 6-142228, JP-A 7-24084, JP-A 7-24085, JP-A 9-10358, and JP-A 11-104273.

However, there is a desire to have a multi-piece solid golf ball having further improved flight performance, good spin properties, and a pleasant feel when hit with wood, iron and putter clubs as well as good scraping resistance and durability.

SUMMARY OF THE INVENTION

Making extensive investigations to meet the above demand, the inventor has found that a multi-piece solid golf ball comprising a solid core and a cover of two inner and outer layers enclosing the solid core and formed with a plurality of dimples is improved when the solid core has a deflection of at least 1.1 mm under an applied load of 294 N (30 kgf) and a surface and a center, the surface-center hardness difference given as the JIS-C hardness on the core surface minus the JIS-C hardness at the core center being greater than 15 units, the cover inner layer is formed of a resin composition comprising as essential components, specific amounts of (a) an olefin-unsaturated carboxylic acid random copolymer, olefin-unsaturated carboxylic acid-unsaturated carboxylic ester random copolymer, or a metal ion neutralized product of the copolymer, or a mixture of the copolymer and the neutralized product, (b) a fatty acid having a molecular weight of at least 280 or derivative thereof, and (c) a basic inorganic metal compound capable of neutralizing acid groups in components (a) and (b), the cover inner layer has a Shore D hardness of 45 to 65, the cover outer layer has a Shore D hardness of 35 to 55, the cover outer layer is softer than the cover inner layer, and the sum of dimple trajectory volumes each obtained by multiplying the volume of a dimple by the square root of a dimple diameter is 530 to 750.

Specifically, the invention provides a multi-piece solid golf ball as defined below.

(1) A multi-piece solid golf ball comprising a solid core and a cover of two inner and outer layers enclosing the solid core, wherein the solid core has a deflection of at least 1.1 mm under an applied load of 294 N (30 kgf) and a surface and a center, the surface-center hardness difference given as a JIS-C hardness at the core surface minus a JIS-C hardness at the core center being greater than 15 units, said cover inner layer is formed of a resin composition comprising as essential components, (a) 100 parts by weight of an olefin-unsaturated carboxylic acid random copolymer, an olefin-unsaturated carboxylic acid-unsaturated carboxylate random copolymer, a metal ion neutralized product of each said copolymer, or a mixture of each said copolymer and the neutralized product, (b) 5 to 80 parts by weight of a fatty acid having a molecular weight of at least 280 or derivative thereof, and (c) 0.1 to 10 parts by weight of a basic inorganic metal compound capable of neutralizing acid groups in components (a) and (b), said cover inner layer has a Shore D hardness of 45 to 65,
said cover outer layer has a Shore D hardness of 35 to 55, said cover outer layer is softer than said cover inner layer, and the sum of dimple trajectory volumes each obtained by multiplying the volume of a dimple by the square root of a dimple diameter is 530 to 750.

(2) The multi-piece solid golf ball of claim 1 wherein said resin composition has a melt index of at least 0.5 dg/sec.

(3) The multi-piece solid golf ball of claim 1 or 2 wherein said cover outer layer is mainly formed of a thermoplastic or thermosetting polyurethane elastomer, polyester elastomer, ionomer resin, polyolefin elastomer or a mixture thereof.

(4) The multi-piece solid golf ball of claim 3 wherein said cover outer layer is mainly formed of a thermoplastic polyurethane elastomer obtained using an aromatic or aliphatic diisocyanate.

(5) The multi-piece solid golf ball of claim 3 wherein said cover outer layer is mainly formed of the reaction product of a thermoplastic polyurethane elastomer with an isocyanate compound.

(6) The multi-piece solid golf ball of any one of claims 1 to 5 wherein component (b) in said resin composition is a fatty acid containing 18 to 80 carbon atoms in the molecule or derivative thereof.

(7) The multi-piece solid golf ball of any one of claims 1 to 6 wherein at least 50 mol % of the acid groups in the essential components (a) and (b) are neutralized with metal ions.

(8) The multi-piece solid golf ball of any one of claims 1 to 7 wherein said cover inner layer is formed of the resin composition comprising up to 100 parts by weight of an olefinic elastomer or polyester elastomer per 100 parts by weight of the essential components (a) to (c) combined.

(9) The multi-piece solid golf ball of any one of claims 1 to 8 further comprising an adhesive layer between said cover inner and outer layers.

(10) The multi-piece solid golf ball of claim 9 wherein the adhesive layer is mainly formed of a urethane resin base adhesive or chlorinated polyolefin base adhesive to a thickness of 0.1 to 30 µm.

(11) The multi-piece solid golf ball of any one of claims 1 to 10 wherein said solid core has a specific gravity of 1.0 to 1.3, said cover inner layer has a specific gravity of 0.8 to 1.5, and said cover outer layer has a specific gravity of 0.9 to 1.3.

(12) The multi-piece solid golf ball of any one of claims 1 to 11 wherein provided that a dimple has a diameter and a depth in elevational cross section at its center, $S_1$ is the cross-sectional area of the dimple and $S_2$ is an area given by multiplying the diameter by the depth, an average SA of dimple cross-sectional area ratios given by $S_1/S_2$ is from 0.58 to 0.68, and the total number of dimples is 360 to 540.

The golf ball of the invention has a stretching flight performance along a relatively low trajectory, an increased travel distance, ease of control on iron shots, and a pleasant feel when hit with wood, iron and putter clubs, and is resistant to scraping and durable upon control shots with an iron club.

The multi-piece solid golf ball of the invention gives a soft feel and good rebound owing to the increased hardness distribution of the core and is best suited for play by those players with a head speed of about 50 m/s. As the same time, the cover inner layer is formed of the resin composition which is improved in thermal stability, flow and moldability and can impart satisfactorily improved resilience, and adjusted to an adequate hardness, so that the cover inner layer may cooperate with the cover outer layer and the solid core to achieve drastic improvements in rebound, durability and controllability.

DETAILED DESCRIPTION OF THE INVENTION

The invention is now described in more detail.

The multi-piece solid golf ball of the invention includes a solid core and a cover of two layer structure consisting of inner and outer layers enclosing the solid core.

The solid core is preferably formed of a rubber composition. The rubber composition used herein is preferably one using polybutadiene as a base rubber. The preferred polybutadiene is 1,4-cis-polybutadiene containing at least 40% cis-configuration. In the base rubber, natural rubber, polyisoprene rubber, styrene-butadiene rubber or the like can be blended with the polybutadiene, if desired. Increasing the rubber component improves the rebound of the golf ball.

In the rubber composition, a crosslinking agent can be blended which is selected from zinc and magnesium salts of unsaturated fatty acids such as zinc dimethacrylate and zinc diacrylate and ester compounds such as trimethylolpropane methacrylate, with zinc diacrylate being especially preferred. An appropriate amount of the crosslinking agent blended is at least 10 parts, especially at least 20 parts by weight per 100 parts by weight of the base rubber, with the upper limit being up to 50 parts, especially up to 39 parts by weight.

A vulcanizing agent is typically blended in the rubber composition. It is recommended that the vulcanizing agent include a peroxide whose temperature corresponding to a half-life of 1 minute is up to 155° C. The content of the peroxide is at least 30%, especially at least 40% by weight based on the entire vulcanizing agent, and its upper limit is preferably up to 70% by weight, though not critical. Such peroxides are commercially available, for example, under the trade name of Perhexa 3M and Percumyl D (NOF K.K.), Luperco 231XL and Luperco 101XL (Elf Atochem). An appropriate amount of the vulcanizing agent blended is at least 0.2 part, especially at least 0.6 part by weight per 100 parts by weight of the base rubber, with the upper limit being up to 2.0 parts, especially up to 1.5 parts by weight.

Further, an antioxidant and a filler for modifying specific gravity such as zinc oxide or barium sulfate can be blended if necessary.

The solid core composition is obtained by blending the above components. The solid core is manufactured by milling the composition in a conventional blending apparatus such as a Banbury mixer or roll mill, and compression or injection molding in a core-forming mold, where the molded part is cured by heating at a sufficient temperature for the crosslinking and co-crosslinking agents to act, for example, about 130 to 170° C., especially 150 to 160° C. for about 10 to 40 minutes, especially about 12 to 20 minutes in an example where dicumyl peroxide is used as the crosslinking agent and zinc diacrylate is used as the co-crosslinking agent, so as to provide a prescribed hardness distribution to the solid core.

The solid core is manufactured by vulcanizing and curing the above rubber composition in a conventional manner while the diameter of the solid core is preferably at least 30 mm, more preferably at least 33 mm, further preferably at least 35 mm and up to 40 mm, more preferably up to 39 mm, further preferably up to 38 mm.

The solid core should have a deflection of at least 1.1 mm under an applied load of 294 N (30 kgf), the deflection being preferably at least 1.2 mm, more preferably at least 1.4 mm, and most preferably at least 1.5 mm. If the deflection of the solid core under an applied load of 294 N (30 kgf) is below the limit, the feel upon hitting of the ball becomes undesirably hard. The upper limit of deflection is preferably up to 2.5 mm, more preferably up to 2.3 mm, most preferably up to 2.1 mm. Too large a deflection may lead to rebound and durability declines.

In the solid core having a surface and a center, the difference between the JIS-C hardness at the core surface and the JIS-C hardness at the core center is optimized for imparting a soft feel and good rebound. The invention requires that the hardness difference given as the JIS-C hardness at the core surface minus the JIS-C hardness at the core center be greater than 15 units, preferably at least 16 units, and more preferably at least 17 units in JIS-C hardness. The upper limit of hardness difference is up to 30 units, especially up to 25 units. The provision of such a hardness difference can accommodate for the play by those players with a head speed of about 50 m/s and allow the excellent behaviors noted above to develop.

In the practice of the invention, the respective JIS-C hardnesses at the core center and surface are not critical. The JIS-C hardness at the core center is usually at least 25, preferably at least 30, more preferably at least 35, while its upper limit is up to 75, preferably up to 70, more preferably up to 65. The JIS-C hardness at the core surface is usually at least 45, preferably at least 50, more preferably at least 55, while its upper limit is up to 95, preferably up to 90, more preferably up to 85.

The solid core preferably has a specific gravity of at least 1.00, more preferably at least 1.05 and further preferably at least 1.10, while its upper limit is preferably up to 1.30, more preferably up to 1.25, and further preferably up to 1.20.

The cover inner layer used herein should be formed of a resin composition comprising as essential components, (a) an olefin-unsaturated carboxylic acid random copolymer, an olefin-unsaturated carboxylic acid-unsaturated carboxylate random copolymer, a metal ion neutralized product of each said copolymer, or a mixture of each said copolymer and the neutralized product, (b) a fatty acid having a molecular weight of at least 280 or derivative thereof, and (c) a basic inorganic metal compound capable of neutralizing acid groups in components (a) and (b).

The resin composition comprising the above components (a) to (c) as essential components is so improved in thermal stability, flow and moldability that a golf ball with good rebound may be obtained. The respective components are first described.

The olefins in component (a) are those having at least 2 carbon atoms and preferably up to 8, especially up to 6 carbon atoms, for example, ethylene, propylene, butene, pentene, hexene, heptene, and octene, with ethylene being especially preferred.

Exemplary of the unsaturated carboxylic acid are acrylic acid, methacrylic acid, maleic acid and fumaric acid, with acrylic acid and methacrylic acid being especially preferred.

Appropriate unsaturated carboxylates are lower alkyl esters of the above-mentioned unsaturated carboxylic acids, for example, methyl methacrylate, ethyl methacrylate, propyl methacrylate, butyl methacrylate, methyl acrylate, ethyl acrylate, propyl acrylate, and butyl acrylate, with the butyl acrylate inclusive of n-butyl acrylate and i-butyl acrylate being especially preferred.

The random copolymers used herein as component (a) are obtained by subjecting the above components to random copolymerization in a well-known manner. The content of unsaturated carboxylic acid in the random copolymer (i.e., acid content) is usually at least 2% by weight, preferably at least 6% by weight, more preferably at least 8% by weight, while its upper limit is recommended to be up to 25% by weight, preferably up to 20% by weight, more preferably up to 15% by weight. Too low an acid content may lead to a decline of resilience whereas too high an acid content may lead to a decline of durability.

The neutralized product of random copolymer used herein as component (a) is obtained by partially neutralizing acid groups in the random copolymer with metal ions. Examples of the metal ion for neutralizing acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred, with $Zn^{++}$ being recommended as most preferable. The degree of neutralization of the random copolymer with metal ions is not critical. The neutralized product is obtained by well-known methods. For example, metal ions can be introduced into the random copolymer using suitable compounds such as formates, acetates, nitrates, carbonates, hydrogencarbonates, oxides, hydroxides, and alkoxides of the metal ions.

For component (a) used herein, there are available, for example, Nucrel AN4311, AN4318, and 1560 (Dupont-Mitsui Polychemical K.K.), Himilan 1554, 1557, 1601, 1605, 1706, 1855, 1856 and AM7316 (Dupont-Mitsui Polychemical K.K.), and Surlyn 6320, 7930, 8120, 8940, 9910, 9945 and 8945 (E. I. Dupont). In particular, zinc ion-neutralized ionomer resins such as Himilan AM7316 are advantageously used.

Component (b) used herein is a fatty acid having a molecular weight of at least 280 or a derivative thereof. It has a very low molecular weight as compared with the above component (a), contributes to an increase in the flow of the resin composition, and also contributes to a marked increase in the melt viscosity of the mixture. The fatty acid or derivative thereof can minimize any loss of resilience on account of the molecular weight of at least 280 and the high content of acid groups or derivatives thereof.

The fatty acid or derivative thereof used herein as component (b) may be an unsaturated fatty acid or derivative whose alkyl group contains a double or triple bond or a saturated fatty acid or derivative whose alkyl group consists of single bonds. The number of carbon atoms in one molecule is usually at least 18, preferably at least 20, more preferably at least 22 and further preferably at least 24. Its upper limit is recommended to be up to 80, preferably up to 60, more preferably up to 40 and further preferably up to 30. A smaller number of carbon atoms may fail to achieve heat resistance improvement and corresponds to a high content of acid groups which can interact with acid groups in component (a) to reduce the flow-improving effects. On the other hand, a larger number of carbon atoms corresponds to a larger molecular weight and may reduce the flow-modifying effects.

Examples of the fatty acid as component (b) include stearic acid, 12-hydroxystearic acid, behenic acid, oleic acid, linoleic acid, linolenic acid, arachidic acid, and lignoceric acid. Of these, stearic acid, arachidic acid, behenic acid and lignoceric acid are preferably used.

Also, the fatty acid derivatives used herein are fatty acids having the proton in their acid group substituted. Such fatty acid derivatives are exemplified by metal soaps resulting from substitution with metal ions. The metal ions used in the metal soaps include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$, and $Co^{++}$, with $Ca^{++}$, $Mg^{++}$ and $Zn^{++}$ being especially preferred.

Illustrative examples of the fatty acid derivative used as component (b) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate, and zinc lignocerate. Preferred among others are magnesium stearate, calcium stearate, zinc stearate, magnesium arachidate, calcium arachidate, zinc arachidate, magnesium behenate, calcium behenate, zinc behenate, magnesium lignocerate, calcium lignocerate, and zinc lignocerate.

It is noted that on use of the above components (a) and (b), known metal soap-modified ionomer resins as disclosed in U.S. Pat. Nos. 5,312,857, 5,306,760 and WO 98/46671 can be used as a combination of components (a) and (b).

Component (c) used herein is a basic inorganic metal compound capable of neutralizing acid groups in components (a) and (b). Component (c) is blended for the following reason. When only a mixture of components (a) and (b), especially only the metal soap-modified ionomer resin (e.g., metal soap-modified ionomer resins described in the above-referred patents) is heated and mixed, exchange reaction occurs between the metal soap and unneutralized acid groups in the ionomer to generate a fatty acid as shown below. The newly generated fatty acid is not only thermally less stable so that it may readily volatilize during molding, causing molding defects, but also has the problem that it can deposit on the surface of a molded part to drastically reduce the receptivity of the molded part to a coating.

[Chemical formula 1]

Here, (1) is an unneutralized acid group on the ionomer resin, (2) is a metallic soap, (3) is a fatty acid, and X is a metal atom.

To solve the above problem, a basic inorganic metal compound capable of neutralizing acid groups in components (a) and (b) is blended as the essential component (c)

in the cover inner layer material according to the invention. With component (c) blended, acid groups in components (a) and (b) are neutralized so that the respective components may cooperate in a synergistic manner to enhance the thermal stability of a heated mixture and impart good moldability. Additionally, the use of this mixture as the cover inner layer material leads to the advantage of improving the rebound of the ball.

Component (c) is not critical as long as it is a basic inorganic metal compound capable of neutralizing acid groups in components (a) and (b). Component (c) is recommended to be a hydroxide for the reason that it can increase the degree of neutralization of the heated mixture, without detracting from thermal stability, because of its high reactivity and exclusion of organic matter in reaction by-products.

Examples of the metal ion used in the basic inorganic metal compound include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Illustrative of the basic inorganic metal compounds are basic inorganic metal compounds containing these metal ions, for example, magnesium oxide, magnesium hydroxide, magnesium carbonate, zinc oxide, sodium hydroxide, sodium carbonate, calcium oxide, calcium hydroxide, lithium hydroxide, and lithium carbonate. Of these, hydroxides are preferred as noted above, and calcium hydroxide is advantageously used which is highly reactive with component (a), especially ionomer resins.

The cover inner layer material used herein is obtained by blending the above components (a), (b) and (c), thereby achieving improvements in thermal stability, moldability and resilience. The blending formulation of these components per 100 parts by weight of component (a) requires that the amount of component (b) be at least 5 parts, preferably at least 10 parts, and especially at least 15 parts by weight. Its upper limit should be up to 80 parts, preferably up to 40 parts, and especially up to 25 parts by weight. The amount of component (c) should be at least 0.1 part, preferably at least 1 part, and especially at least 2 parts by weight while its upper limit should be up to 10 parts, preferably up to 8 parts, and especially up to 6 parts by weight. Too small an amount of component (b) blended lowers the melt viscosity and hence, processability, whereas too large an amount lowers the durability and fails to provide the desired properties as the cover inner layer, eventually leading to the deteriorated performance of the golf ball. Too small an amount of component (c) blended achieves no improvements in thermal stability and resilience whereas too large an amount rather detracts from the heat resistance of the composition on account of the excess of basic inorganic metal compound.

For the cover inner layer material used herein, the above-described mixture may be used as such or another suitable material may be blended therein. In either case, the material is preferably used after adjusting the melt index of a heated mixture as measured in accordance with JIS-K6760 at a test temperature of 190° C. and under a test load of 21 N (2.16 kgf). It is recommended that the melt index be at least 0.5 dg/sec, preferably at least 1.0 dg/sec, and more preferably at least 1.5 dg/sec. Its upper limit is usually recommended to be up to 20 dg/sec, and preferably up to 15 dg/sec. Some heated mixtures with a too low melt index may suffer from a substantial loss of processability.

Further preferably, the cover inner layer material is characterized in terms of the relative absorbance in infrared absorption spectroscopy, representing the ratio of absorbance at the absorption peak attributable to carboxylate stretching vibrations normally detected at 1530 to 1630 $cm^{-1}$ to the absorbance at the absorption peak attributable to carbonyl stretching vibrations normally detected at 1690 to 1710 $cm^{-1}$. Note that this ratio is expressed as the absorbance of absorption peak for carboxylate stretching vibrations divided by the absorbance of absorption peak for carbonyl stretching vibrations.

Here, "carboxylate stretching vibrations" refers to vibrations by carboxyl groups from which the proton has dissociated (metal ion-neutralized carboxyl groups), whereas "carbonyl stretching vibrations" refers to vibrations by undissociated carboxyl groups. The ratio in these respective peak intensities depends on the degree of neutralization. In the case of commonly used ionomer resins having a degree of neutralization of about 50 mol %, the ratio between these peak absorbances is about 1:1.

To improve the thermal stability, moldability and resilience of the material, it is recommended that the cover inner layer material have a carboxylate stretching vibration peak absorbance which is at least 1.5 times, and preferably at least 2 times, the carbonyl stretching vibration peak absorbance. The absence of a carbonyl stretching vibration peak altogether is especially preferred.

Also the thermal stability of the cover inner layer material can be measured by thermogravimetry. It is recommended that, in thermogravimetric analysis, the material have a weight loss at 250° C., based on the weight of the mixture at 25° C., of not more than 2% by weight, preferably not more than 1.5% by weight, and most preferably not more than 1% by weight.

While the cover inner layer material of the invention essentially includes the above components (a), (b) and (c), it is recommended that at least 50 mol %, preferably at least 55 mol %, more preferably at least 60 mol %, further preferably at least 70 mol %, and most preferably at least 80 mol %, of the acid groups in the essential components (a) and (b) be neutralized. Such a high degree of neutralization makes it possible to more reliably suppress the exchange reaction which becomes a problem when only the above component (a) and component (b), i.e., fatty acid or fatty acid derivative are used, and thus prevents the formation of fatty acid. As a result, there can be obtained a material of greatly increased thermal stability and good moldability which has a much greater resilience than prior art cover inner layer materials, typically ionomer resins. To more reliably achieve both a high degree of neutralization and good flow characteristics, it is recommended that neutralization of the material involve neutralization of the acid groups in the essential components with transition metal ions and alkali metal and/or alkaline earth metal ions. Because transition metal ions have weaker ionic cohesion than alkali metal and alkaline earth metal ions, the use of transition metal ions to neutralize some of the acid groups in the essential components can provide a substantial improvement in the flow characteristics.

The molar ratio between the transition metal ions and the alkali or alkaline earth metal ions may be adjusted as appropriate, although a ratio within a range of from 10:90 to 90:10 is preferred, and a ratio of from 20:80 to 80:20 is especially preferred. Too low a molar ratio of transition metal ions may fail to provide sufficient improvement in the flow characteristics of the material whereas too high a molar ratio may lower the resilience.

Specific examples of the metal ions include zinc ions as the transition metal ions, and at least one type of ion selected from among sodium ions, lithium ions, magnesium ions and calcium ions as the alkali metal or alkaline earth metal ions.

No particular limitation is imposed on the method of obtaining a heated mixture in which the acid groups are neutralized with transition metal ions and alkali metal or alkaline earth metal ions. For example, specific methods of neutralization with transition metal ions, typically zinc ions, include the use of zinc soap as the fatty acid, the inclusion of a zinc-neutralized polymer as component (a), and the use of zinc oxide as the basic inorganic metal compound of component (c).

In the cover inner layer material of the invention, various thermoplastic resins and thermoplastic elastomers other than component (a) may be blended as an optional component in addition to the essential components for the purpose of further improving the feel and rebound of the ball when hit. Such thermoplastic elastomers include, for example, polyolefin elastomers, polyester elastomers, polyurethane elastomers, polyamide elastomers, and polystyrene elastomers. In particular, the use of polyolefin elastomers and polyester elastomers is recommended.

More particularly, examples are linear low-density polyethylene, low-density polyethylene, high-density polyethylene, polypropylene, rubber-reinforced olefin polymers, flexomers, plastomers, thermoplastic elastomers (styrene block copolymers and hydrogenated polybutadiene-ethylene-propylene rubber) including acid modified ones, dynamically vulcanized elastomers, ethylene acrylate, and ethylene vinyl acetate. Commercially available are, for example, HPR by Dupont-Mitsui Polychemical K.K. and Dynalon by JSR.

In the practice of the invention, the proportion of the above-mentioned optional component such as the polyolefin elastomer or polyester elastomer blended is recommended to be usually up to 100 parts, preferably up to 80 parts, more preferably up to 60 parts, further preferably up to 50 parts, and most preferably up to 40 parts by weight per 100 parts by weight of the essential components (a) to (c) combined while its lower limit is recommended to be at least 0 part, preferably at least 5 parts, more preferably at least 10 parts, further preferably at least 15 parts, and most preferably at least 20 parts by weight.

In the cover inner layer material, various additives can be compounded if necessary. Such additives include, for example, pigments, dispersants, antioxidants, UV absorbers and photo-stabilizers. Other exemplary additives are inorganic fillers such as zinc oxide, barium sulfate, and titanium dioxide. The amount of the inorganic filler blended is usually up to 30% by weight, preferably up to 20% by weight, with the lower limit being at least 1% by weight.

According to the invention, the cover inner layer is formed by the resin composition comprising the above components (a) to (c) as essential components, having improved thermal stability, flow and moldability, and capable of producing a golf ball with improved rebound while any well-known method may be employed for that formation. For instance, the resin composition is compounded at a temperature of 150 to 250° C. using an internal mixer such as a kneading-type twin-screw extruder, a Banbury mixer or a kneader whereby the cover inner layer material is prepared. Note that compounding conditions and methods may be modified as appropriate.

The cover inner layer preferably has a specific gravity of at least 0.8, more preferably at least 0.9, further preferably at least 0.92 and most preferably at least 0.93 while its upper limit is preferably up to 1.5, more preferably up to 1.2, further preferably up to 1.16, still further preferably up to 1.1, and most preferably up to 1.05.

It is noted that the cover inner layer preferably has a gage of at least 0.5 mm, more preferably at least 0.9 mm, and further preferably at least 1.1 mm while its upper limit is recommended to be up to 3.0 mm, more preferably up to 2.5 mm, and further preferably up to 2.0 mm.

Also the cover inner layer has an optimized Shore D hardness to be described later.

Next, the cover outer layer used herein is preferably formed of materials based on thermoplastic resins or thermosetting resins, though not limited thereto. The base of the cover outer layer material is selected, for example, from thermoplastic or thermosetting polyurethane elastomers, polyester elastomers, ionomer resins, polyolefin elastomers or mixtures thereof. They may be used alone or in admixture of two or more. Commercially available are, for example, Surlyn 6320, Himilan 1855 and Surlyn 8120. These elastomers will be described later in detail.

With the base of the cover outer layer material, polymers such as thermoplastic elastomers other than the above-mentioned may be blended as an optional component. For example, polyamide elastomers, styrene block elastomers, hydrogenated polybutadiene or ethylene-vinyl acetate (EVA) copolymers may be blended as the optional component polymer.

For the cover outer layer material, the above-mentioned base may be used alone or the optional component polymer may be blended with the base usually in an amount of at least 0 part, preferably at least 10 parts, more preferably at least 15 parts by weight per 100 parts by weight of the base. The upper limit of the blending amount is up to 100 parts, preferably up to 75 parts, and more preferably up to 50 parts by weight. Upon blending, suitable adjustment may be made in accordance with a particular purpose such as hardness adjustment, resilience improvement, flow improvement or adhesion improvement.

In the practice of the invention, the cover outer layer favors the use of thermoplastic polyurethane elastomers or ionomer resins as the base. The thermoplastic polyurethane elastomer used herein has a molecular structure consisting of a high molecular weight polyol compound constituting a soft segment, a monomolecular chain extender constituting a hard segment, and a diisocyanate.

The high molecular weight polyol compound is not critical and may be any of polyester polyols, polyether polyols, copolyester polyols, and polycarbonate polyols. Exemplary polyester polyols include polycaprolactone glycol, poly(ethylene-1,4-adipate) glycol, and poly(butylene-1,4-adipate) glycol; an exemplary copolyester polyol is poly(diethylene glycol adipate) glycol; an exemplary polycarbonate polyol is (hexanediol-1,6-carbonate) glycol; and an exemplary polyether polyol is polyoxytetramethylene glycol. Their number average molecular weight is about 600 to 5,000, preferably about 1,000 to 3,000.

As the diisocyanate, aliphatic diisocyanates are preferably used in consideration of the yellowing resistance of the cover. Examples include hexamethylene diisocyanate (HDI), 2,2,4- or 2,4,4-trimethylhexamethylene diisocyanate (TMDI), and lysine diisocyanate (LDI). HDI is especially preferred for its compatibility with another resin upon blending.

The monomolecular chain extender is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDA), and isophoronediamine (IPDA).

Of the above-mentioned thermoplastic polyurethane elastomers, those having a tanδ peak temperature of not higher than −15° C., especially not higher than −16° C., and not lower than −50° C. as determined by viscoelasticity measurement are preferred for softness and resilience.

As the thermoplastic polyurethane elastomer, there may be used commercially available ones whose diisocyanate component is aliphatic, for example, Pandex T7298 (−20° C.), T7295 (−26° C.), and T7890 (−30° C.) from Bayer-DIC Polymer K.K. Note that the tanδ peak temperature is indicated in the parentheses.

The cover outer layer material used herein may also be the reaction product of the thermoplastic polyurethane elastomer mentioned above with an isocyanate compound to be described later whereby a further improvement is made in the surface durability upon iron shots.

The isocyanate compound used herein may be any of isocyanate compounds conventionally used in the prior polyurethane art. Although the isocyanate compound is not limited to the following examples, aromatic isocyanate compounds include 2,4-toluene diisocyanate, 2,6-toluene diisocyanate, a mixture of 2,4-toluene diisocyanate and 2,6-toluene diisocyanate, 4,4-diphenylmethane diisocyanate, m-phenylene diisocyanate and 4,4'-biphenyl diisocyanate. Hydrogenated products of these aromatic isocyanates such as dicyclohexylmethane diisocyanate are also useful. Additionally, aliphatic diisocyanates such as tetramethylene diisocyanate, hexamethylene diisocyanate (HDI), and octamethylene diisocyanate are useful as well as alicyclic diisocyanates such as xylene diisocyanate.

Other useful examples of the isocyanate compound include blocked isocyanate compounds obtained by reacting a compound having at least two isocyanate groups at ends with a compound having active hydrogen and uretidione compounds resulting from dimerization of isocyanate.

The amount of the isocyanate compound blended is usually at least 0.1 part, preferably at least 0.2 part, more preferably at least 0.3 part by weight per 100 parts by weight of the thermoplastic polyurethane elastomer while its upper limit is up to 10 parts, preferably up to 5 parts, and more preferably up to 3 parts by weight. Too small amounts of the isocyanate compound may fail to provide sufficient crosslinking reaction and a noticeable physical improvement whereas too large amounts may cause problems such as substantial discoloration by aging, heating and UV, a thermoplasticity loss and a resilience decline.

As noted above, the cover outer layer may also be formed of a material based on an ionomer resin. The cover outer layer can be formed of materials based on ionomer resins commonly used in conventional solid golf ball cover stock. Illustrative examples of the ionomer resin include Himilan 1855 (Dupont-Mitsui Polychemical K.K.) and Surlyn 8120, 8320 and 6320 (E. I. Dupont), and a combination of two or more ionomer resins is acceptable. If necessary, the ionomer resin may be compounded with well-known additives such as pigments, dispersants, antioxidants, UV absorbers, UV stabilizers, and plasticizers. The cover outer layer material may contain an inorganic filler such as zinc oxide, barium sulfate or titanium dioxide in an amount of at least 1%, especially at least 1.5% by weight and up to 30%, especially up to 20% by weight.

Whenever it is formed of any of the aforementioned materials, the cover outer layer is preferably adjusted in specific gravity. An appropriate specific gravity is at least 0.9, preferably at least 0.95 and more preferably at least 1.0 and ranges up to 1.3, preferably up to 1.25 and more preferably up to 1.22.

It is noted that the cover outer layer preferably has a gage of at least 0.5 mm, more preferably at least 0.9 mm, and further preferably at least 1.1 mm while its upper limit is recommended to be up to 2.5 mm, more preferably up to 2.3 mm, and further preferably up to 2.0 mm.

Herein, the total gage of the cover inner and outer layers, that is, the gage of the overall cover is usually at least 1.0 mm, preferably at least 1.5 mm, and more preferably at least 2.0 mm, while its upper limit is recommended to be up to 5.5 mm, preferably up to 4.5 mm, and more preferably up to 3.5 mm.

The invention requires to optimize the Shore D hardness of the cover inner and outer layers. The cover inner layer should have a Shore D hardness of at least 45, preferably at least 47, more preferably at least 49, further preferably at least 50, still further preferably at least 52, and most preferably at least 54 while its upper limit be up to 65, preferably up to 63, more preferably up to 61, further preferably up to 60, still further preferably up to 59, yet further preferably up to 58, and most preferably up to 57. A too soft cover inner layer leads to a resilience decline whereas a too hard cover inner layer adversely affects the feel.

On the other hand, the cover outer layer should have a Shore D hardness of at least 35, preferably at least 38, more preferably at least 40, and further preferably at least 42, while its upper limit be up to 55, preferably up to 53, more preferably up to 52, and further preferably up to 50. A too soft cover outer layer leads to excessive spin receptivity and a reduced travel distance whereas a too hard cover outer layer gives a hard feel and adversely affects the spin performance.

According to the invention, the cover outer layer is made softer than the cover inner layer. Herein, the difference between the hardness of the cover outer layer and the hardness of the cover inner layer is usually at least 2 units, more preferably at least 5 units, further preferably at least 7 units, and most preferably at least 9 units in Shore D hardness while its upper limit is recommended to be up to 30 units, preferably up to 25 units, and more preferably up to 20 units. Too small a hardness difference tends to provide excessive spin receptivity and a reduced travel distance whereas too large a hardness difference may lead to a durability decline.

Between the cover inner and outer layers, an adhesive layer may be provided for the purpose of improving the durability upon hitting. The adhesive used herein may be selected from epoxy resin base adhesives, vinyl resin base adhesives, rubber base adhesives and the like. In particular, urethane resin base adhesives and chlorinated polyolefin base adhesives are preferably used. Commercially available products which are advantageously used herein are Resamine D6208 (Dainichi Seika Kogyo K.K., urethane resin base adhesive) and RB182 Primer (Nippon Bee Chemical K.K., chlorinated polyolefin base adhesive).

Herein, the adhesive layer can be formed by dispersion coating. The type of emulsion used in dispersion coating is not critical. The resin powder used in preparing the emulsion may be either a thermoplastic resin powder or a thermosetting resin powder. For example, vinyl acetate resins, vinyl acetate copolymer resins, EVA (ethylene-vinyl acetate copolymer) resins, acrylate (co)polymer resins, epoxy resins, thermosetting urethane resins, and thermoplastic urethane resins are useful. Of these, epoxy resins, thermosetting urethane resins, thermoplastic urethane resins and acrylate (co)polymer resins are preferred, with the thermoplastic urethane resins being most preferred.

It is noted that the adhesive layer preferably has a gage of at least 0.1 μm, more preferably at least 0.2 μm, and especially at least 0.3 μm, while its upper limit is up to 30 μm, more preferably up to 25 μm, and especially up to 20 μm.

According to the invention, the cover outer layer is formed with a plurality of dimples. The sum of dimple trajectory volumes each obtained by multiplying the volume of a dimple by the square root of a dimple diameter should range from 530 to 750.

The most desired parameter associated with a golf ball is an increased travel distance. With the run taken into account, a golf ball adapted to follow a low trajectory is often advantageous in terms of the total distance. Analyzing numerous sets of data, the inventor has found that the angle of elevation is governed by the sum of dimple trajectory volumes which are each obtained by multiplying the volume of a dimple by the square root of a dimple diameter (referred to as total dimple trajectory volume). By optimizing the total dimple trajectory volume, the variation in flight performance of the ball is minimized. Preferably by further optimizing the dimple cross-sectional area ratio to be defined below, the carry at the same angle of elevation can be further increased. This has made a success in developing dimples ensuring a stretching low trajectory.

More particularly, the golf ball of the invention is designed such that the sum of dimple trajectory volumes VT which are each obtained by multiplying the volume of a dimple by the square root of a dimple diameter (referred to as total dimple trajectory volume TVT) is 530 to 750. The lower limit of TVT is at least 530, preferably at least 550, more preferably at least 580, and most preferably at least 600 while the upper limit is up to 750, preferably up to 730, more preferably up to 700, and most preferably up to 670.

Figure 1:
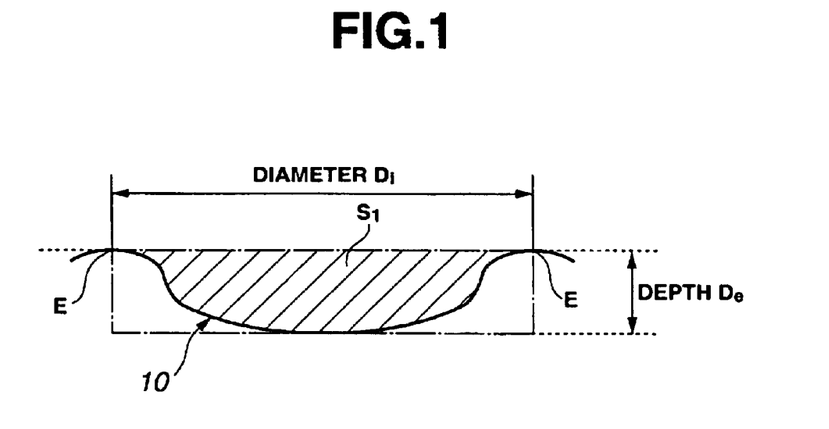
FIG. 1 is a schematic illustration of a dimple shape according to the invention.

Referring to FIG. 1, a dimple 10 is illustrated in elevational cross section at its center, with a line connecting the left and right highest points in the figure being horizontal. The highest points are designated dimple edges E, E. The dimple has a diameter Di defined by the distance between edges E and E. The dimple has a depth De defined by the distance from the line connecting the edges E and E to the deepest bottom of the dimple. Then the dimple volume V is the space of the dimple delimited by the edge plane. The dimple has an elevational cross-sectional area $S_1$ defined by the shaded region in FIG. 1.

Specifically, the TVT as used herein is the sum of VT (=VxDi$^{0.5}$) of all dimples. From a value of TVT, an approximate trajectory height is determined. In general, a smaller value of TVT leads to a greater angle of elevation, and a larger value of TVT leads to a smaller angle of elevation. As described above, the invention sets the TVT within the above-defined range. TVT below the range leads to a too high trajectory and failure to gain a run, resulting in a reduced total distance. TVT beyond the range leads to a too low trajectory and hence a short carry, also resulting in a reduced distance. With TVT outside the range, the variance of carry becomes increased and the stability of performance is lost in either case.

It is noted that the golf ball of the invention is preferably adapted to be launched at an elevation angle of at least 8.6°, more preferably at least 8.7° and up to 9.3°, more desirably up to 9.2°, further desirably up to 9.1°, and most desirably up to 9.0°, when hit with a driver having a loft angle of 7.5° at a head speed of 50 m/s.

In one preferred embodiment, provided that $S_1$ is the elevational cross-sectional area of the dimple at the center and $S_2$ is the area given by multiplying the diameter Di by the depth De, an average SA of dimple cross-sectional area ratios $S_0$ given by $S_1/S_2$ is from 0.58 to 0.68. In a further preferred embodiment, dimples having a dimple cross-sectional area ratios So of from 0.58 to 0.68 account for at least 80% of the entire dimples.

The parameters $S_1$, Di and De used herein are as defined above. $S_2$ is the area of a rectangle delimited by dot-and-dash lines in FIG. 1. SA is the sum of $S_0$ of dimples divided by the total number n of dimples.

According to the invention, SA is preferably at least 0.58, more preferably at least 60, and further preferably at least 0.62 while the upper limit is recommended to be up to 0.68, more preferably up to 0.67, and further preferably up to 0.66. Too small SA may lead to a run-restraining trajectory whereas too large SA may lead to a carry-restraining trajectory.

Of the entire dimples, at least 80%, more preferably at least 88% and further preferably at least 94% of dimples have a $S_0$ in the range of 0.58 to 0.68. Even with SA set within the above-defined range, the disadvantage of lacking both carry and run can manifest unless those dimples accounting for at least 80% of the entire dimples have a $S_0$ in the above-defined range.

It is noted that each dimple is of circular shape in a plane and preferably has a diameter of at least 1.8 mm, more preferably at least 2.4 mm, and further preferably at least 3.0 mm while its upper limit is preferably up to 4.6 mm, more preferably up to 4.4 mm, and further preferably up to 4.2 mm. The dimple depth is preferably at least 0.08 mm, more preferably at least 0.10 mm, and further preferably at least 0.12 mm while its upper limit is preferably up to 0.22 mm, more preferably up to 0.20 mm, and further preferably up to 0.19 mm.

The total number n of dimples is generally at least 360, preferably at least 370, and further preferably at least 380 while its upper limit is up to 540, preferably up to 500, and further preferably up to 450. In a preferred embodiment, the dimples are multiple type dimples given as a combination of dimples of at least two types, preferably at least three types which are different in diameter and up to six types, preferably up to five types which are different in diameter. A combination of dimples of two or more types which are different in depth is also acceptable. A combination of dimples of more than two types and less than 11 types, especially less than 9 types which are different in VT is thus preferable.

For the arrangement of the above-described dimples, any well-known technique may be used. No particular limit is imposed as long as the dimples are evenly distributed. There may be employed any of the octahedral arrangement, icosahedral arrangement, and sphere division techniques of equally dividing a hemisphere into 2 to 6 regions wherein dimples are distributed in the divided regions. Fine adjustments or modifications may be made on these techniques. It is also preferred herein that the dimple surface coverage be at least 69%, more preferably at least 70%, and further preferably at least 72% while its upper limit be up to 85%, more preferably up to 82%, and further preferably up to 77%.

The golf ball of the invention is generally completed as a product by further coating the cover with a paint. It is recommended that the golf ball of the invention is formed so as to experience a compression deformation when a load of 980 N (100 kg) is applied to the ball (referred to as 100-kgf hardness, hereinafter) of at least 2.0 mm, more preferably at least 2.2 mm and further preferably at least 2.5 mm and up to 4.0 mm, more preferably up to 3.7 mm and further preferably up to 3.5 mm. Too low a 100-kgf. hardness tends to provide a hard feel whereas too high a 100-kgf hardness may lead to durability and resilience declines.

The diameter and weight of the golf ball of the invention comply with the Rules of Golf. The ball is formed to a diameter in the range of at least 42.67 mm and preferably up to 44 mm, more preferably up to 43.5 mm and further preferably up to 43 mm. The weight is not more than 45.92 grams while the lower limit is preferably at least 44.5 g, more preferably at least 44.8 g, further preferably at least 45.0 g and most preferably at least 45.1 g.

EXAMPLE

Examples and comparative examples are given below for illustrating the invention, though the invention is not limited to these examples.

Examples & Comparative Examples

Three-piece solid golf balls as shown in Tables 7 and 8 were conventionally prepared by furnishing a solid core as shown in Tables 1 and 2, successively forming a cover inner layer as shown in Table 3 and a cover outer layer as shown in Table 4 on the solid core, and uniformly forming dimples as shown in Tables 5 and 6. In the case of golf balls using an adhesive, an adhesive as shown below was used in a well-known manner.

Examples 1, 2, Comparative Examples 1, 8: Resamine D6208 (Dainichi Seika Kogyo K.K., urethane resin base adhesive) Examples 3, 4, 5, 8: RB182 Primer (Nippon Bee Chemical K.K., chlorinated polyolefin base adhesive)

The golf balls thus obtained were subjected to flight tests according to the following procedures and examined for spin rate, feel, scraping resistance and continuous durability. The results are shown in Tables 7 and 8.

Flight Test

Using a swing robot manufactured by Miyamae K.K., 20 balls of each Example were hit with a driver (#W1) at a head speed of 50 m/s. A carry and total distance were measured.

Club Used

Head: manufactured by Bridgestone Sports Co., Ltd., J's METAL, loft angle 7.5°,
SUS630 stainless steel, lost wax process
Shaft: Harmotech Pro, HM-70, LK (low kick point), hardness X Spin The spin rate was calculated by hitting the ball with a driver (#Wb) or a sand wedge (#SW) at a head speed (HS) of 20 m/s, photographing the behavior of the ball immediately after the impact, and carrying out image analysis.

Feel

Three professional golfers actually hit the ball with a drive (#W1) or a putter (#PT) and rated the feel according to the following criteria.

○: soft
Δ: somewhat hard
×: hard

Scraping Resistance

The ball was hit at two arbitrary points with a sand wedge (#SW) at a head speed of 38 m/s using a swing robot, and visually observed and rated.

⊙: very good
○: good
Δ: ordinary
×: poor

Durability Against Consecutive Strikes

The ball was consecutively hit at a head speed of 38 m/s using a flywheel hitting machine, and rated in terms of the number of hits until the ball failed.

○: good
Δ: ordinary
×: poor

It is noted that the ingredients described in Tables 1 to 8 are as follows.

(1) Dicumyl peroxide: Percumyl D, by NOF K.K.
(2) Peroxide: Luperco 101XL, by Elf Atochem
Liquid monomer SR-351: trimethylolpropane triacrylate (TMPTA), by Sartomer Co.
Dynalon: hydrogenated polybutadiene, by JSR
Hytrel: thermoplastic polyester elastomer, by Dupont-Toray K.K.
Nucrel: ethylene-methacrylic acid-acrylate copolymer or ethylene-methacrylic acid copolymer, by Dupont-Mitsui Polychemical K.K.
PEBAX: thermoplastic polyamide elastomer, by Elf Atochem
Surlyn: ionomer resin, by E. I. Dupont
Himilan: ionomer resin, by Dupont-Mitsui Polychemical K.K. (The neutralizing metal is shown in the parentheses following Surlyn and Himilan.)
Polybutadiene: JSR BR11, by JSR
Antioxidant A: Nocrack NS6, by Ohuchi Shinko Chemical K.K.
Antioxidant B: Yoshinox 425, by Yoshitomi Pharmaceuticals K.K.
Pandex: thermoplastic polyurethane elastomer, by Bayer-DIC Polymer K.K.
VIBRATHANE B-601: thermosetting urethane prepolymer, by Uniroyal Chemical
ETHACURE 300: liquid polyamine curing agent, by ETHYL (The method of preparing VIBRATHANE B-601 and ETHACURE 300 involved heating ETHACURE 300 and VIBRATHANE B-601 at 40° C. and 80° C., respectively, mixing the heated liquids, pouring the mixture into a mold heated at 100° C., curing at the temperature for 3 minutes, and annealing at 100° C. for 16 hours.)
Diphenylmethane diisocyanate: by Nippon Polyurethane K.K.
Dicyclohexylmethane diisocyanate: by Bayer-Sumitomo Urethane K.K.
Trans-polyisoprene: TP-301, by Kurare K.K.
(3) Peroxide C: Varox 230XL, by Elf Atochem

TABLE 1

| Core composition (pbw) | E1 | E2 | E3 | E4 | E5 | E6 | E7 | E8 |
|---|---|---|---|---|---|---|---|---|
| Polybutadiene | 100 | 100 | 100 | 100 | 100 | 100 | 100 | 100 |
| (1) Dicumyl peroxide | 1.2 | 1.2 | 1.2 | 1.2 | 1.2 | 1.2 | 1.2 | 1.2 |
| Barium sulfate | 10.3 | 10.3 | 13.7 | 13.7 | 14.3 | 22.6 | 12.5 | 14.4 |
| Zinc white | 5 | 5 | 5 | 5 | 5 | 5 | 5 | 5 |
| Antioxidant A | 0.2 | 0.2 | 0.2 | 0.2 | 0.2 | 0.2 | 0.2 | 0.2 |
| Zinc salt of pentachlorothiophenol | 1 | 1 | 1 | 1 | 1 | 1 | 1 | 1 |

TABLE 1-continued

| Core composition (pbw) | | | E1 | E2 | E3 | E4 | E5 | E6 | E7 | E8 |
|---|---|---|---|---|---|---|---|---|---|---|
| Zinc diacrylate | | | 29.6 | 29.6 | 25.9 | 25.9 | 27.4 | 35.5 | 27.4 | 24.4 |
| Vulcanizing conditions | 1st stage | Temp. (° C.) | 160 | 160 | 160 | 160 | 160 | 155 | 160 | 165 |
| | | Time (min) | 16 | 16 | 16 | 16 | 16 | 15 | 16 | 17 |

TABLE 2

| Core composition (pbw) | CE1 | CE2 | CE3 | CE4 | CE5 | CE6 | CE7 | CE8 | CE9 |
|---|---|---|---|---|---|---|---|---|---|
| Polybutadiene | 100 | 100 | 100 | 100 | 100 | 100 | 100 | 100 | 100 |
| (1) Dicumyl peroxide | 1.2 | 1.2 | 1.2 | | | 1.2 | 1.2 | 1.2 | 1.2 |
| (2) Peroxide | | | | 0.8 | 1.2 | | | | |
| Barium sulfate | 0.7 | 19.1 | 22.4 | | | 13.6 | 24.0 | 1.2 | 12.3 |
| Zinc white | 3.8 | 5 | 5 | 35 | 18.5 | 5 | 5 | 5 | 5 |
| Antioxidant A | 0.2 | 0.2 | 0.2 | 0.8 | | 0.2 | 0.2 | 0.2 | 0.2 |
| Antioxidant B | | | | | 0.5 | | | | |
| Liquid monomer SR-351 | | | | 5 | | | | | |
| Zinc salt of pentachlorothiophenol | 1 | 1 | 1 | | | 1 | 1 | 1 | 1 |
| Zinc diacrylate | 39.2 | 33.3 | 35.5 | 12.2 | 25.0 | 34.0 | 27.4 | 34.8 | 29.6 |
| Vulcanizing conditions | | | | | | | | | |
| 1st stage Temp. (° C.) | 155 | 160 | 160 | 145 | 145 | 160 | 160 | 160 | 160 |
| 1st stage Time (min) | 15 | 16 | 16 | 25 | 25 | 16 | 16 | 16 | 16 |
| 2nd stage Temp. (° C.) | | | | 165 | 165 | | | | |
| 2nd stage Time (min) | | | | 5 | 5 | | | | |

TABLE 3

| Cover inner layer material (pbw) | | a | b | c | d | e | f | g | h | i | j | k |
|---|---|---|---|---|---|---|---|---|---|---|---|---|
| Component (a) | Nucrel AN4318 | 100 | | 15 | 15 | | | | | | | |
| | Nucrel 1560 | | | 85 | | 100 | | | | | | |
| | Himilan AN7316 (Zn) | | 100 | | | | | | | | | |
| | Himilan 1706 (Zn) | | | | 42.5 | | | | | | | |
| | Himilan 1605 (Na) | | | | 42.5 | | | | | 50 | | |
| | Himilan 1557 (Zn) | | | | | | | | | 50 | | |
| | Surlyn 8940 (Na) | | | | | | | | | | 75 | |
| | Surlyn 9910 (Zn) | | | | | | | | | | 25 | |
| | Surlyn 9945 (Zn) | | | | | | | | | | | 26 |
| | Surlyn 8945 (Na) | | | | | | | | | | | 26 |
| Component (b) | Behenic acid | 20 | 20 | 20 | 20 | 20 | | | | | | |
| Component (c) | Calcium hydroxide | 4.5 | 3.0 | 5.0 | 3.0 | 5.5 | | | | | | |
| Others | Hytrel 4047 | | | | | | 100 | | | | | |
| | PEBAX 3533 | | | | | | | 100 | | | | |
| | Dynelon 6100P | | | | | | | | | | | 48 |
| | Titanium dioxide | 2 | 2 | 2 | 2 | 2 | | | 5.1 | 5.1 | | 5.1 |
| | Polybutadiene rubber | | | | | | | | | | 100 | |
| | Zinc diacrylate | | | | | | | | | | 40 | |
| | Zinc white | | | | | | | | | | 12.5 | |
| | Antioxidant B | | | | | | | | | | 0.5 | |
| | Dicumyl peroxide | | | | | | | | | | 1.5 | |
| Vulcanizing conditions | Temp. (° C.) | | | | | | | | | | 160 | |
| | Time (min) | | | | | | | | | | 20 | |
| Degree of neutralization (%) | | 80 | 79 | 61 | 66 | 64 | — | — | <50 | <50 | — | <50 |

TABLE 4

| Cover outer layer material (pbw) | | A | B | C | D | E | F | G | H | I | J | K |
|---|---|---|---|---|---|---|---|---|---|---|---|---|
| Resin composition | Pandex T7890 | | | | | | | 100 | | | | |
| | Pandex TR3080 | 30 | | 50 | | | | | | | | |
| | Pandex T7298 | 70 | 100 | 50 | | | | | | | | |
| | Hytrel 4047 | | | | 100 | | | | | | | |
| | Nucrel AN4212C | | | | | 30 | | | | | | |
| | Surlyn 8120 | | | | | | | | 100 | | 60 | |
| | Himilan 1605 (Na) | | | | | 20 | | | | | | |
| | Himilan 1706 (Zn) | | | | | 20 | | | | | 40 | |

TABLE 4-continued

| Cover outer layer material (pbw) | | A | B | C | D | E | F | G | H | I | J | K |
|---|---|---|---|---|---|---|---|---|---|---|---|---|
| | Himilan 1855 | | | | | 30 | | | | | | 50 |
| | Himilan 1856 | | | | | | | | | | | 50 |
| | VIBRATHANE B-601 | | | | | | 100 | | | | | |
| | Titanium dioxide | 2.7 | 2.7 | 2.7 | 2.7 | 4 | 2.7 | 2.7 | 5.1 | | 5.1 | 5.1 |
| | ETHACURE 300 | | | | | | 15.3 | | | | | |
| | Diphenylmethane diisocyanate | 1 | 1 | | | | | | | | | |
| | Dicyclohexyl-methane diisocyanate | | | 1.5 | | | | | | | | |
| Rubber composition | Trans-polyisoprene | | | | | | | | | 60 | | |
| | Polybutadiene | | | | | | | | | 40 | | |
| | Zinc oxide | | | | | | | | | 5 | | |
| | Titanium dioxide | | | | | | | | | 17 | | |
| | Ultramarine blue color | | | | | | | | | 0.5 | | |
| | Zinc diacrylate | | | | | | | | | 35 | | |
| | (3) peroxide | | | | | | | | | 2.5 | | |
| Vulcanizing conditions | Temp. (° C.) | | | | | | | | | 150 | | |
| | Time (min) | | | | | | | | | 8 | | |

TABLE 5

| | | Example | | | | | | | |
|---|---|---|---|---|---|---|---|---|---|
| | Dimples | 1 | 2 | 3 | 4 | 5 | 6 | 7 | 8 |
| (1) | Number | 72 | 72 | 72 | 72 | 72 | 72 | 72 | 72 |
| | Diameter (mm) | 4.100 | 4.080 | 4.040 | 4.100 | 4.080 | 4.040 | 4.040 | 4.100 |
| | Depth (mm) | 0.163 | 0.183 | 0.167 | 0.163 | 0.183 | 0.167 | 0.167 | 0.163 |
| (2) | Number | 200 | 200 | 200 | 200 | 200 | 200 | 200 | 200 |
| | Diameter (mm) | 3.950 | 3.980 | 3.940 | 3.950 | 3.980 | 3.940 | 3.940 | 3.950 |
| | Depth (mm) | 0.154 | 0.174 | 0.155 | 0.154 | 0.174 | 0.155 | 0.155 | 0.154 |
| (3) | Number | 120 | 120 | 120 | 120 | 120 | 120 | 120 | 120 |
| | Diameter (mm) | 3.140 | 3.180 | 3.180 | 3.140 | 3.180 | 3.180 | 3.180 | 3.140 |
| | Depth (mm) | 0.128 | 0.133 | 0.129 | 0.128 | 0.133 | 0.129 | 0.129 | 0.128 |
| Total of (1) to (3) | | 392 | 392 | 392 | 392 | 392 | 392 | 392 | 392 |
| Average SA | | 0.649 | 0.649 | 0.593 | 0.649 | 0.649 | 0.593 | 0.593 | 0.649 |
| Total dimple trajectory volume ($mm^{3.5}$) | | 615.4 | 694.3 | 546.4 | 615.4 | 694.3 | 546.4 | 546.4 | 615.4 |

TABLE 6

| | | Comparative Example | | | | | | | | |
|---|---|---|---|---|---|---|---|---|---|---|
| | Dimples | 1 | 2 | 3 | 4 | 5 | 6 | 7 | 8 | 9 |
| (1) | Number | 54 | 72 | 72 | 150 | 156 | 156 | 72 | 288 | 150 |
| | Diameter (mm) | 4.100 | 4.040 | 4.040 | 3.650 | 4.027 | 4.027 | 4.000 | 3.850 | 3.650 |
| | Depth (mm) | 0.210 | 0.177 | 0.167 | 0.150 | 0.152 | 0.152 | 0.200 | 0.175 | 0.150 |
| (2) | Number | 174 | 200 | 200 | 210 | 204 | 204 | 200 | 72 | 210 |
| | Diameter (mm) | 3.850 | 3.940 | 3.940 | 3.500 | 3.638 | 3.638 | 3.850 | 3.250 | 3.500 |
| | Depth (mm) | 0.210 | 0.165 | 0.155 | 0.150 | 0.137 | 0.137 | 0.193 | 0.170 | 0.150 |
| (3) | Number | 132 | 120 | 120 | | 60 | 60 | 120 | 42 | |
| | Diameter (mm) | 3.400 | 3.100 | 3.180 | | 2.487 | 2.487 | 3.400 | 2.500 | |
| | Depth (mm) | 0.210 | 0.139 | 0.129 | | 0.095 | 0.095 | 0.170 | 0.170 | |
| Total of (1) to (3) | | 360 | 392 | 392 | 360 | 420 | 420 | 392 | 402 | 360 |
| Average SA | | 0.666 | 0.574 | 0.593 | 0.627 | 0.643 | 0.643 | 0.666 | 0.689 | 0.627 |
| Total dimple trajectory volume ($mm^{3.5}$) | | 854.5 | 540.3 | 546.4 | 513.4 | 602.3 | 602.3 | 839.9 | 800.3 | 513.4 |

TABLE 7

| | Example | | | | | | | |
|---|---|---|---|---|---|---|---|---|
| | 1 | 2 | 3 | 4 | 5 | 6 | 7 | 8 |
| Core | | | | | | | | |
| Outer diameter (mm) | 36.40 | 36.40 | 36.40 | 36.40 | 36.60 | 36.00 | 37.00 | 36.20 |
| Surface-center JIS C hardness difference | 18 | 18 | 19 | 19 | 19 | 17 | 19 | 20 |
| 30-kgf loaded deflection (mm) | 1.74 | 1.74 | 2.02 | 2.02 | 1.91 | 1.29 | 1.91 | 2.13 |
| Specific gravity | 1.142 | 1.142 | 1.152 | 1.152 | 1.159 | 1.222 | 1.149 | 1.152 |
| Cover inner layer | | | | | | | | |
| Type | a | b | c | c | c | d | d | e |
| Shore D hardness | 51 | 51 | 60 | 60 | 60 | 60 | 60 | 63 |
| Specific gravity | 0.97 | 0.97 | 0.97 | 0.97 | 0.97 | 0.97 | 0.97 | 0.97 |
| Gage (mm) | 1.35 | 1.35 | 1.65 | 1.65 | 1.55 | 1.85 | 1.55 | 1.75 |
| Adhesive | applied | applied | applied | applied | applied | no | no | applied |
| Cover outer layer | | | | | | | | |
| Type | A | B | A | C | D | E | F | G |
| Specific gravity | 1.183 | 1.183 | 1.183 | 1.183 | 1.142 | 0.98 | 1.183 | 1.183 |
| Gage (mm) | 1.80 | 1.79 | 1.50 | 1.49 | 1.50 | 1.49 | 1.29 | 1.50 |
| Shore D hardness | 47 | 50 | 47 | 45 | 40 | 49 | 50 | 42 |
| Ball | | | | | | | | |
| Weight (g) | 45.35 | 45.25 | 45.35 | 45.29 | 45.30 | 45.25 | 45.30 | 45.30 |
| Outer diameter (mm) | 42.70 | 42.67 | 42.69 | 42.67 | 42.70 | 42.67 | 42.68 | 42.70 |
| #W1/HS50 | | | | | | | | |
| Carry (m) | 226.5 | 225.5 | 231.5 | 227.0 | 225.0 | 232.0 | 231.0 | 227.5 |
| Total (m) | 257.0 | 256.5 | 259.0 | 258.0 | 256.0 | 259.0 | 258.5 | 257.5 |
| Spin (rpm) | 3120 | 3158 | 3023 | 3061 | 3130 | 3098 | 3035 | 3108 |
| Feel | ○ | ○ | ○ | ○ | ○ | ○ | ○ | ○ |
| Trajectory | low, stretching trajectory | low, somewhat rising, stretching trajectory | somewhat high, but stretching trajectory | low, stretching trajectory | low, somewhat rising, stretching trajectory | somewhat high, but stretching trajectory | somewhat high, but stretching trajectory | low, stretching trajectory |
| #SW/H520 approach spin (rpm) | 6257 | 6223 | 6270 | 6331 | 6412 | 6208 | 6328 | 6390 |
| #PT feel | ○ | ○ | ○ | ○ | ○ | ○ | ○ | ○ |
| Scraping resistance | ◎ | ○ | ◎ | ◎ | ○ | ○ | ○ | ○ |
| Durability against consecutive strikes | ○ | ○ | ○ | ○ | ○ | ○ | ○ | ○ |

TABLE 8

| | Comparative Example | | | | | | | | |
|---|---|---|---|---|---|---|---|---|---|
| | 1 | 2 | 3 | 4 | 5 | 6 | 7 | 8 | 9 |
| Core | | | | | | | | | |
| Outer diameter (mm) | 35.50 | 36.40 | 36.00 | 38.10 | 34.90 | 36.50 | 36.50 | 36.70 | 36.60 |
| Surface-center JIS C hardness difference | 16 | 18 | 18 | 10 | 10 | 18 | 19 | 18 | 19 |
| 30-kgf loaded deflection (mm) | 1.01 | 1.46 | 1.29 | 1.74 | 2.02 | 1.40 | 1.91 | 1.35 | 1.74 |
| Specific gravity | 1.107 | 1.199 | 1.221 | 1.177 | 1.155 | 1.171 | 1.212 | 1.105 | 1.153 |
| Cover inner layer | | | | | | | | | |
| Type | f | g | h | i | j | f | h | f | k |
| Shore D hardness | 40 | 42 | 60 | 60 | 69 | 40 | 60 | 40 | 51 |
| Specific gravity | 1.12 | 1.01 | 0.97 | 0.98 | 1.15 | 1.12 | 0.97 | 1.12 | 0.95 |
| Gage (mm) | 1.63 | 1.80 | 1.75 | 0.95 | 2.50 | 1.60 | 1.60 | 1.50 | 1.60 |
| Adhesive | applied | no | no | no | no | no | no | applied | no |

TABLE 8-continued

|  | Comparative Example | | | | | | | | |
|---|---|---|---|---|---|---|---|---|---|
|  | 1 | 2 | 3 | 4 | 5 | 6 | 7 | 8 | 9 |
| Cover outer layer | | | | | | | | | |
| Type | C | H | E | I | E | J | K | G | B |
| Specific gravity | 1.183 | 0.980 | 0.980 | 0.980 | 0.980 | 0.980 | 0.980 | 1.183 | 1.183 |
| Gage (mm) | 1.98 | 1.34 | 1.60 | 1.36 | 1.40 | 1.50 | 1.50 | 1.50 | 1.45 |
| Shore D hardness | 45 | 45 | 49 | 45 | 49 | 53 | 55 | 42 | 50 |
| Ball | | | | | | | | | |
| Weight (g) | 45.40 | 45.25 | 45.30 | 45.30 | 45.30 | 45.40 | 45.35 | 45.30 | 45.30 |
| Outer diameter (mm) | 42.70 | 42.67 | 42.70 | 42.72 | 42.70 | 42.70 | 42.70 | 42.70 | 42.70 |
| #W1/HS50 | | | | | | | | | |
| Carry (m) | 215.5 | 225.5 | 225.0 | 226.0 | 213.0 | 223.0 | 214.0 | 218.0 | 226.5 |
| Total (m) | 243.0 | 251.5 | 252.0 | 250.5 | 247.0 | 249.5 | 244.0 | 249.0 | 251.0 |
| Spin (rpm) | 3448 | 3360 | 3118 | 3125 | 2888 | 3420 | 2885 | 3442 | 3112 |
| Feel | X | Δ | ○ | Δ | ○ | Δ | ○ | ○ | ○ |
| Trajectory | too low, dropping trajectory | Somewhat high, skying trajectory | Somewhat high, but stretching trajectory | high, skying trajectory | low, dropping trajectory | low launching, skying trajectory | too low, dropping trajectory | too low, dropping trajectory | high, skying trajectory |
| #SW/HS20 approach spin (rpm) | 6352 | 6348 | 6220 | 6152 | 6086 | 6211 | 5903 | 6304 | 6111 |
| #PT feel | ○ | ○ | ○ | ○ | X | ○ | ○ | ○ | ○ |
| Scraping resistance | Δ | Δ | ○ | X | X | Δ | ○ | ○ | ○ |
| Durability against consecutive strikes | ○ | ○ | ○ | X | X | ○ | ○ | ○ | ○ |

As is evident from the above results, all multi-piece solid golf balls within the scope of the invention exhibit improved flight and spin performances, provide a satisfactory feel when hit with a driver, iron and putter, and have improved scraping resistance and durability.

In contrast, the multi-piece solid golf balls of Comparative Examples which did not use the cover inner layer material of the invention have the following drawbacks.

Comparative Example 1, in which the core has a short deflection, the cover inner layer has a lower Shore D hardness, and the cover inner layer is softer than the cover outer layer, when hit with a driver, provided a poor feel, followed a too low, dropping trajectory and traveled short.

Comparative Example 2, in which the cover inner layer has a lower Shore D hardness and the cover outer layer has a higher hardness than the cover inner layer, followed a relatively skying trajectory and traveled short.

Comparative Example 3, in which the cover inner layer uses the ionomer resin alone and the structure is similar to Example 6, was inferior in distance.

Comparative Example 4 followed a too high, skying trajectory and was inferior in distance. The cover outer layer of balata was scraped. Rebound and manufacturing efficiency were low.

Comparative Example 5, in which the cover inner layer has a too high Shore D hardness, was less durable and provided a poor feel upon putting.

Comparative Example 6, in which the cover inner layer is too soft, and the cover outer layer is harder than the cover inner layer, received much spin, followed a low launching, skying trajectory, and traveled short.

Comparative Example 7, in which the cover inner layer uses the ionomer resin alone, followed a too low, dropping trajectory and traveled short.

Comparative Example 8, in which the cover inner layer is soft and the cover outer layer is harder than the cover inner layer, followed a too low, dropping trajectory and traveled short.

Comparative Example 9, in which the cover inner layer material includes an ionomer resin and an olefinic elastomer, followed a too high, skying trajectory and traveled short.

The multi-piece solid golf balls of the invention have the advantages of increased distance, ease of control, favorable feel, and durability and are suited especially for play by those players with a head speed of 50 m/s.

What is claimed is:

1. A multi-piece solid golf ball comprising a solid core and a cover of two inner and outer layers enclosing the solid core, wherein
   the solid core has a deflection of at least 1.1 mm under an applied load of 294 N (30 kgf) and a surface and a center thereof have a JIS-C hardness of 45 to 95 and of 25 to 75, respectively, and the surface-center hardness difference given as a JIS-C hardness at the core surface minus a JIS-C hardness at the core center is greater than 15 units,
   said cover inner layer is formed of a resin composition comprising as essential components,
   (a) 100 parts by weight of an olefin-unsaturated carboxylic acid random copolymer, an olefin-unsaturated carboxylic acid-unsaturated carboxylate random copolymer, a metal ion neutralized product of each said copolymer, or a mixture of each said copolymer and the neutralized product,
   (b) 5 to 80 parts by weight of a fatty acid having a molecular weight of at least 280 or derivative thereof, and
   (c) 0.1 to 10 parts by weight of a basic inorganic metal compound capable of neutralizing acid groups in components (a) and (b), said cover inner layer has a Shore D hardness of 45 to 65, said cover outer layer has a Shore D hardness of 35 to 55, said cover outer layer is softer than said cover inner layer, and the sum of dimple trajectory volumes each obtained by multiplying the volume of a dimple by the square root of a dimple diameter is 530 to 750.

2. The multi-piece solid golf ball of claim 1 wherein said resin composition has a melt index of at least 0.5 dg/sec.

3. The multi-piece solid golf ball of claim 1 wherein said cover outer layer is mainly formed of a thermoplastic or thermosetting polyurethane elastomer, polyester elastomer, ionomer resin, polyolefin elastomer or a mixture thereof.

4. The multi-piece solid golf ball of claim 3 wherein said cover outer layer is mainly formed of a thermoplastic polyurethane elastomer obtained using an aromatic or aliphatic diisocyanate.

5. The multi-piece solid golf ball of claim 3 wherein said cover outer layer is mainly formed of the reaction product of a thermoplastic polyurethane elastomer with an isocyanate compound.

6. The multi-piece solid golf ball of claim 1 wherein component (b) in said resin composition is a fatty acid containing 18 to 80 carbon atoms in the molecule or derivative thereof.

7. The multi-piece solid golf ball of claim 1 wherein at least 50 mol % of the acid groups in the essential components (a) and (b) are neutralized with metal ions.

8. The multi-piece solid golf ball of claim 1 wherein said cover inner layer is formed of the resin composition comprising up to 100 parts by weight of an olefinic elastomer or polyester elastomer per 100 parts of weight of the essential components (a) to (c) combined.

9. The multi-piece solid golf ball of claim 1 further comprising an adhesive layer between said cover inner and outer layers.

10. The multi-piece solid golf ball of claim 9 wherein the adhesive layer is mainly formed of a urethane resin base adhesive or chlorinated polyolefin base adhesive to a thickness of 0.1 to 30 $\mu$m.

11. The multi-piece solid golf ball of claim 1 wherein said solid core has a specific gravity of 1.0 to 1.3, said cover inner layer has a specific gravity of 0.8 to 1.5, and said cover outer layer has a specific gravity of 0.9 to 1.3.

12. The multi-piece solid golf ball of claim 1 wherein provided that a dimple has a diameter and a depth in elevational cross section at its center, $S_1$ is the cross-sectional area of the dimple and $S_2$ is an area given by multiplying the diameter by the depth, an average SA of dimple cross-sectional area ratios given by $S_1/S_2$ is from 0.58 to 0.68, and the total number of dimples is 360 to 540.

* * * * *